US007806241B2

(12) United States Patent
Takahashi et al.

(10) Patent No.: US 7,806,241 B2
(45) Date of Patent: Oct. 5, 2010

(54) ELECTRIC BRAKE

(75) Inventors: Hideaki Takahashi, Tokyo (JP); Kimio Takahashi, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 260 days.

(21) Appl. No.: 11/523,500

(22) Filed: Sep. 20, 2006

(65) Prior Publication Data
US 2007/0062764 A1    Mar. 22, 2007

(30) Foreign Application Priority Data
Sep. 21, 2005    (JP)    ............ P.2005-273498

(51) Int. Cl.
*B60L 7/10* (2006.01)
*F16D 55/00* (2006.01)

(52) U.S. Cl. .................... 188/159; 188/157; 188/73.2

(58) Field of Classification Search ............ 188/71.1, 188/73.1, 156, 157, 158, 159, 196 R
See application file for complete search history.

(56) References Cited
U.S. PATENT DOCUMENTS

| 4,602,702 A | * | 7/1986 | Ohta et al. ............... 188/72.1 |
| 4,799,575 A | * | 1/1989 | Kroniger ............... 188/71.6 |
| 5,090,518 A | * | 2/1992 | Schenk et al. .......... 188/72.1 |
| 5,284,227 A | * | 2/1994 | Pelfrey ................. 188/71.1 |
| 5,515,948 A | * | 5/1996 | Gilliland ............... 188/72.5 |
| 6,040,665 A | * | 3/2000 | Shirai et al. .............. 318/14 |
| 6,186,599 B1 | * | 2/2001 | Otomo et al. ............. 303/20 |
| 6,386,333 B1 | * | 5/2002 | Russell ................. 188/71.6 |
| 6,830,141 B1 | * | 12/2004 | Neelakantan et al. ...... 192/84.6 |

FOREIGN PATENT DOCUMENTS
JP    2000-74106    3/2000

* cited by examiner

*Primary Examiner*—Melody M Burch
(74) *Attorney, Agent, or Firm*—Morgan, Lewis & Bockius LLP

(57) ABSTRACT

Pistons 3 and 7 are pressed to a friction member 11 at two points that are positioned at a rotating-in side and a rotating-out side in a rotating direction of a brake rotor 10. An axial force control is performed for the piston 3 on the rotating-out side, and a position control based on the position of the piston 3 on the rotating-out side is performed for the piston 7 on the rotating-in side.

10 Claims, 4 Drawing Sheets

\# CALCULATION EXAMPLE (PID CONTROL)
$E_0$ = PROPORTIONAL GAIN × (F' - F) +
INTEGRAL GAIN × $\int$(F' - F) + DIFFERENTIAL GAIN × $\frac{d}{dt}$(F' - F)

\#\# CALCULATION EXAMPLE (PID CONTROL)
$E_1$ = PROPORTIONAL GAIN × ($\theta_0$ - $\theta_1$) +
INTEGRAL GAIN × $\int$($\theta_0$ - $\theta_1$) + DIFFERENTIAL GAIN × $\frac{d}{dt}$($\theta_0$ - $\theta_1$)

ELECTRIC BRAKE

This application claims foreign priority from Japanese Patent Application No. 2005-273498, filed on Sep. 21, 2005, the entire contents of which are hereby incorporated by reference.

BACKGROUND OF THE INVENTION

1. Field of the Invention

The present invention relates to an electric brake that converts rotational motions of motors fixed to a brake system into linear motions so as to move forward pistons of the brake system and to press friction members to a rotary member to apply the brake.

2. Related Art

An internal combustion engine, which uses gasoline or the like as fuel, has been used as a power source in a vehicle such as an automobile to obtain high power. However, an electric vehicle or a hybrid electric vehicle has been used in recent years in terms of environmental measures or fuel efficiency, and an electric motor has been used as a main power source or an auxiliary power source. Accordingly, an electric brake has also been commonly used, in which an electric motor being supplied with electric power is used as a power source of braking. In general, the electric brake using an electric motor as a power source converts the rotational motion of the motor into a linear motion so as to move forward pistons of a brake system so that friction members are pressed to a rotary member to apply the brake. Therefore, when the rotation angle of the electric motor is analyzed, it is possible to control a pressing force (that is, displacement) that is applied to a brake rotor by a friction member through a displacement of the piston converted into a linear motion.

In general, a friction member is pressed to the rotary member such as a brake rotor, by a piston during the braking. However, when the friction member is pressed to the rotary member by the piston or the like, a pressure plate provided on the backside of the brake pad forming the friction member is pressed at a pin point. Accordingly, the pressure plate may be bent. As a result, since the brake pad is not uniformly contacted with the rotary member such as a brake rotor, there has been an undesirable possibility that an uneven wear occurs in the brake pad or the brake rotor. For this reason, a technology for preventing the uneven wear of the brake pad and the like has bee proposed (for example, see JP-A-2000-074106).

An electric brake system disclosed in JP-A-2000-074106 will be described in brief with reference to FIGS. 4A and 4B. A pressure plate 78 formed integrally with a brake pad 74 is formed so that a contact surface of the pressure plate to be contacted with a spindle 72 forms a convex part 78a. Further, the convex part 78a is formed to include a spherical large curvature part 78b at a contact portion to be contacted with the spindle 72, and a small curvature part 78c having a smaller curvature than the large curvature part 78b at a portion except for the contact portion. The pressure plate 78 may be fixed to a mounting bracket so that the center of the large curvature part 78b is on the axis of the spindle 72.

According to the above structure, when the bend of the brake pad in a pressing direction is suppressed in the electric brake system that uses an electric motor as a power source to obtain a braking force, it is possible to prevent the uneven wear of the brake pad 74. However, even though it is possible to suppress the uneven wear of the brake pad 74 caused by the pressure plate 78 in the pressing direction, any consideration is not made for a winding load generated when the brake pad 74 is pressed to a brake rotor 42, among common loads. For this reason, it has been still insufficient to reliably prevent the uneven wear of the brake pad.

SUMMARY OF THE INVENTION

One or more embodiments of the present invention provide a method of controlling an electric brake to prevent uneven wear that can prevent the winding of the brake pad caused by the rotation of a rotor during the braking so as to suppress uneven wear.

In accordance with one or more embodiments of the present invention, in the electric brake that converts rotational motions of motors fixed to a brake system into linear motions so as to move forward pistons of the brake system and presses friction members to a rotary member to apply the brake, a method of controlling an electric brake to prevent uneven wear is provided with the steps of: pressing the pistons to the friction member at two points that are positioned at a rotating-in side and a rotating-out side in the rotating direction of the rotary member; performing an axial force control for the piston on the rotating-out side; and performing a position control based on the position of the piston on the rotating-out side for the piston on the rotating-in side.

Further, in accordance with one or more embodiments of the present invention, in the electric brake that converts rotational motions of motors fixed to a brake system into linear motions so as to move forward pistons of the brake system and presses friction members to a rotary member to apply the brake, a method of controlling an electric brake to prevent uneven wear is provided with the steps of: pressing the pistons to the friction member at two points that are positioned on both sides of the rotary member at a rotating-in side and a rotating-out side in the rotating direction of the rotary member, performing axial force controls for the pistons on the rotating-out side, and performing position controls based on the positions of the pistons on the rotating-out side for the pistons on the rotating-in side. Further, in the above-mentioned methods, a sensor for detecting the position of a magnetic pole may be used in each motor to detect the positions of the pistons.

According to the embodiments of the invention, in the electric brake that converts rotational motions of motors fixed to a brake system into linear motions so as to move forward pistons of the brake system and presses friction members to a rotary member to apply the brake, a method of controlling an electric brake to prevent uneven wear is provided with the steps of: pressing the pistons to the friction member at two points that are positioned at a rotating-in side and a rotating-out side in the rotating direction of the rotary member, performing an axial force control for the piston on the rotating-out side, and performing a position control based on the position of the piston on the rotating-out side for the piston on the rotating-in side. Since the pistons are pressed to the friction member at two points that are positioned at the rotating-in side and the rotating-out side in the rotating direction of the rotary member, a pressing force is dispersed. As a result, it is possible to use a motor having a small capacity. Furthermore, since a position control based on the position of the piston on the rotating-out side is performed for the piston on the rotating-in side, it is possible to effectively prevent an excessive axial force from being applied to the friction member in accordance with a winding load generated at the rotating-in side. As a result, it is possible to prevent the uneven wear of the brake pad.

Further, in the electric brake that converts rotational motions of motors fixed to a brake system into linear motions so as to move forward pistons of the brake system and presses friction members to a rotary member to apply the brake, a method of controlling an electric brake to prevent uneven wear is provided with the steps of: pressing the pistons to the friction member at two points that are positioned on both sides of the rotary member at a rotating-in side and a rotating-out side in the rotating direction of the rotary member, performing axial force controls for the pistons on the rotating-out side, and performing position controls based on the positions of the pistons on the rotating-out side for the pistons on the rotating-in side. As a result, friction members such as brake pads come in contact with the both sides of the rotary member. Since a pressing force is further dispersed as described above even in the case of an electric brake capable of uniformly and reliably applying the brake, it is possible to use a motor having a small capacity. Furthermore, since a position control based on the position controls of the pistons on rotating-out side are performed for the pistons on the rotating-in side, it is possible to effectively prevent an excessive axial force from being applied to the brake pad in accordance with a winding load generated at the rotating-in side. As a result, it is possible to prevent the uneven wear of the brake pad.

Other aspects and advantages of the invention will be apparent from the following description and the appended claims.

DETAILED DESCRIPTION OF THE EXEMPLARY EMBODIMENTS

Exemplary embodiments of the invention will be described with reference to the accompanying drawings.

Figure 1:
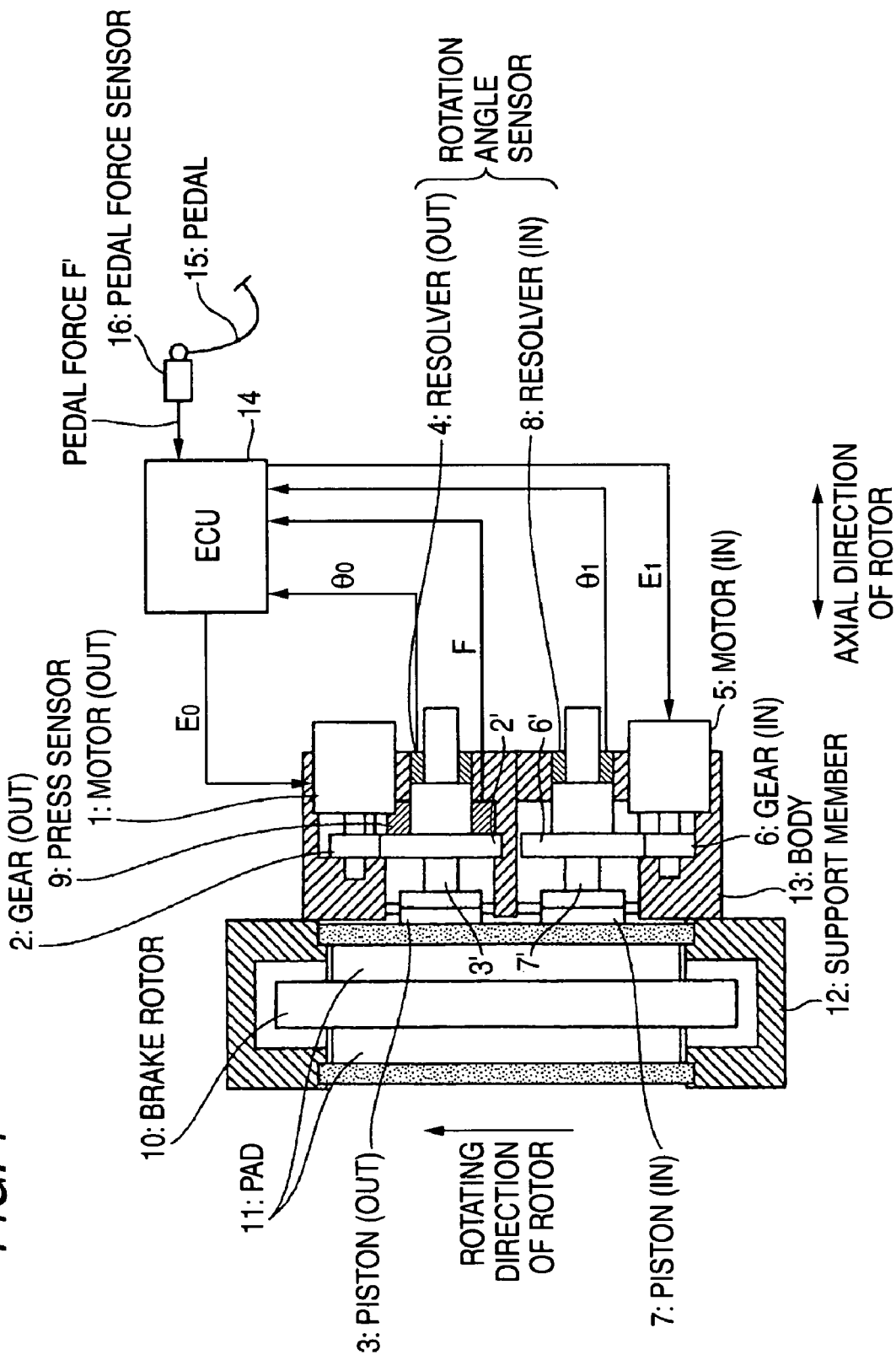
FIG. 1 is a view showing an entire configuration of an electric brake according to a first exemplary embodiment of the invention.
Figure 2:
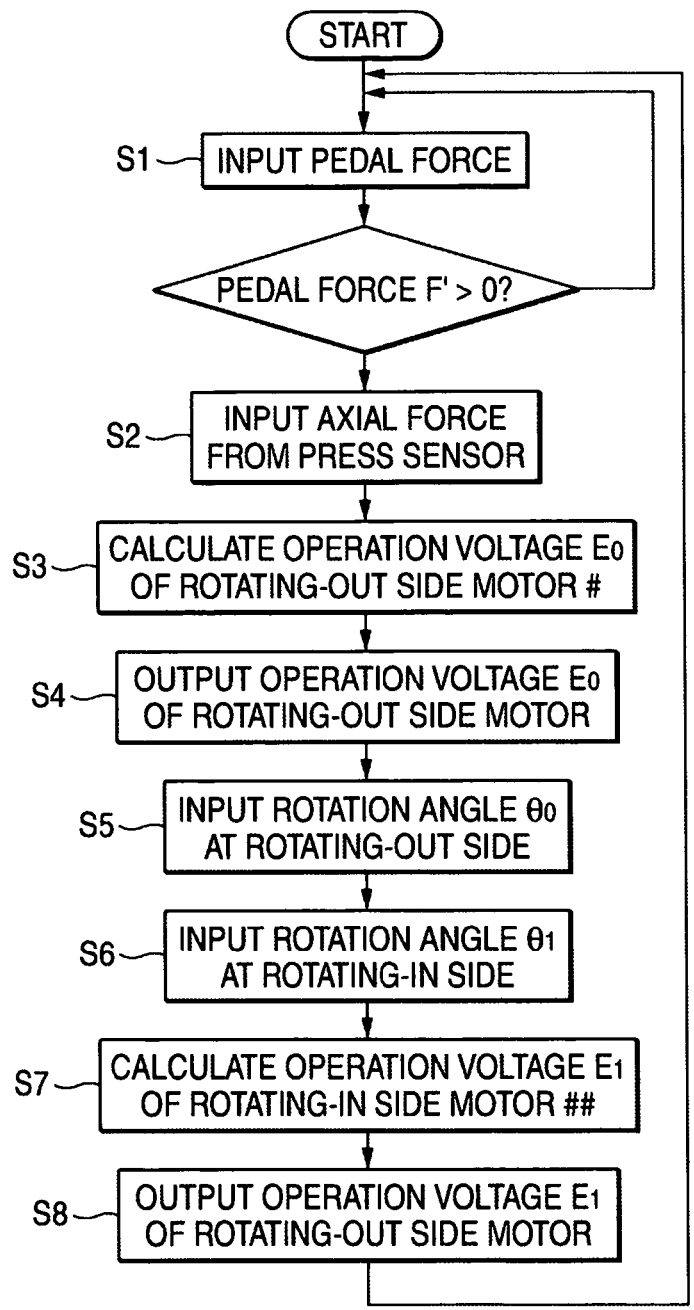
FIG. 2 is a flow chart of a method of controlling the electric brake according to the first exemplary embodiment of the invention.
Figure 3:
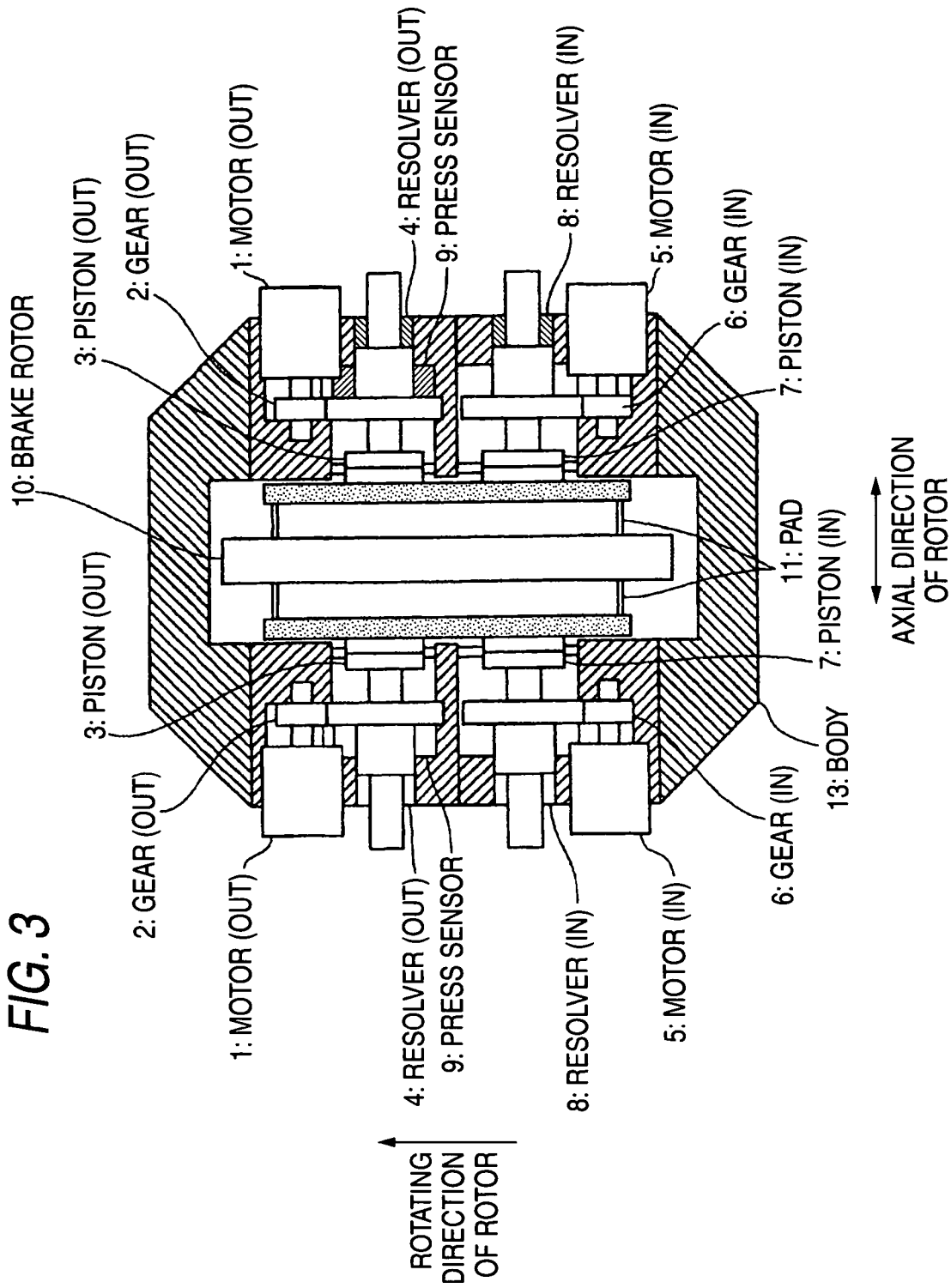
FIG. 3 is a view showing a partial configuration of an electric brake according to a second exemplary embodiment of the invention.
Figure 4A:
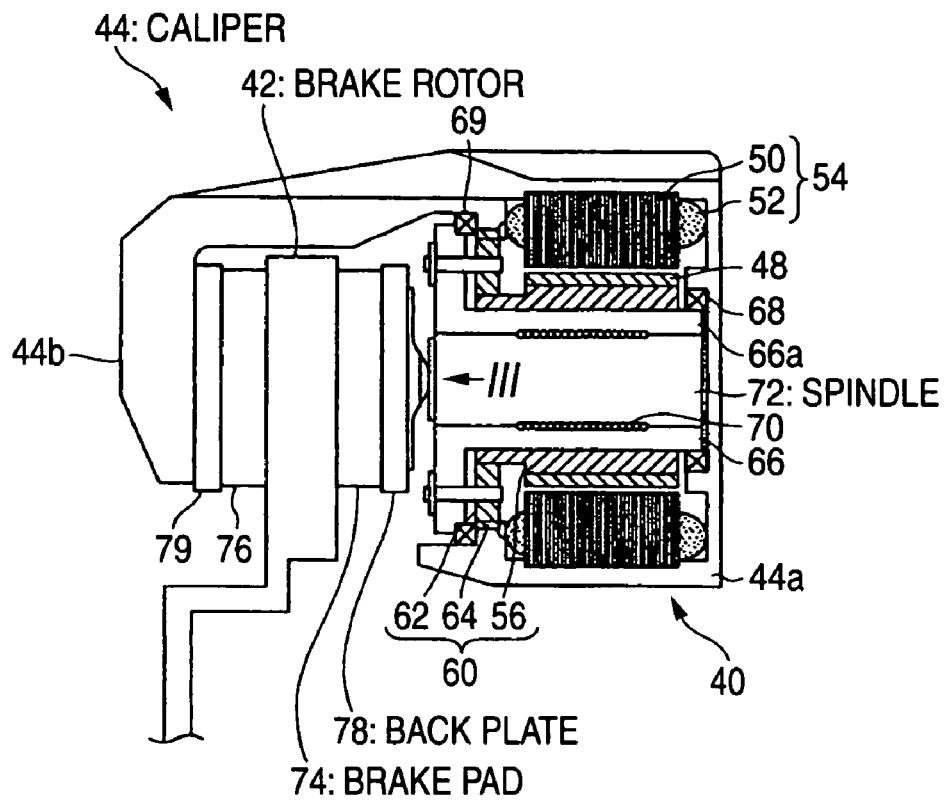
FIG. 4A is a cross-sectional view of an electric brake in a related art.
Figure 4B:
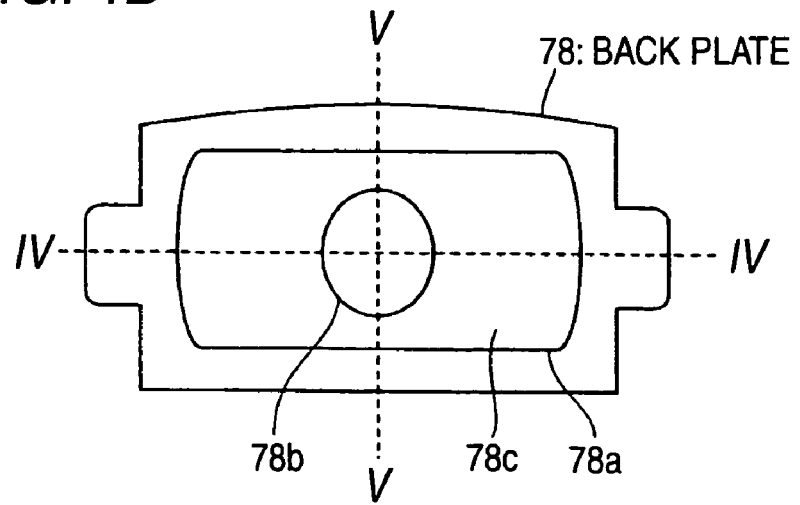
FIG. 4B is a front view of a brake pad in the related art.

FIG. 1 is a view showing the entire configuration of an electric brake according to a first exemplary embodiment of the invention, and FIG. 2 is a flow chart of a control method of the electric brake according to the first exemplary embodiment. FIG. 3 is a view showing the partial configuration of an electric brake according to the second embodiments of the invention.

In the electric brake according to the first exemplary embodiment, as shown in FIG. 1, the electric brake converts rotational motions of motors fixed to a brake system into linear motions so as to move forward pistons of the brake system so that friction members 11 are pressed to a rotary member 10 to apply the brake. The pistons 3 and 7 are pressed to the friction member 11 at two points that are positioned at a rotating-in side and a rotating-out side in a rotating direction of the rotary member 10 (a brake rotor 10). That is, the pistons 3 and 4 in the first exemplary embodiment are both disposed in one side of an axial direction of the brake rotor 10. In the two pistons, one piston 3 (a first piston 3) is disposed on the rotating-out side in the rotating direction of the brake rotor 10, and the other piston 7 (a second piston 7) is disposed on the rotating-in side in the rotating direction of the brake rotor 10.

Further, an axial force control is performed for the first piston 3, and a position control based on the position of the first piston 3 is performed for the second piston 7.

The brake system of the exemplary embodiment relates to the following electric brake. The electric brake converts rotational motions of motors using an electric energy as a power source into linear motions so as to move forward pistons of the brake system so that friction members are pressed to a rotary member to apply the brake. The operation and configuration of the electric brake will be described below. When a pedal force of a pedal 15 is detected by a pedal force sensor 16, a predetermined pedal force F' is input to a controller ECU 14. Meanwhile, two brushless electric motors 1 and 5 are fixed to a body 13 of the brake system. In the motors 1 and 5, the motor 1 disposed in the rotating-out side of the rotating direction of the brake rotor 10 is a first motor 1, and the motor 5 disposed in the rotating-in side of the rotating direction of the brake rotor 10 is a second motor. The rotational motions of the motors 1 and 5 are converted into the linear motions of two pistons 3 and 7 by gear trains. Accordingly, the pistons are pressed to a brake pad 11 at two points that are positioned at the rotating-in side and the rotating-out side in the rotating direction of a brake rotor 10.

The operation of the pistons performed by the gear trains of the motors will be described below in detail. The first brushless motor 1 (the first motor 1) disposed on the rotating-out side in the rotating direction of the brake rotor 10 (rotary member) is fixed to the body 13. A rotating-out side gear 2, which has a small diameter and is fixed to a shaft of the first brushless motor 1, is engaged with a large-diameter gear 2' fixed to a shaft 3' of the first piston 3 that is disposed parallel to the shaft of the first brushless motor 1. When the large-diameter gear 2' rotates, the rotational motion of the first brushless motor 1 is converted into the linear motion of the shaft 3' of the large-diameter gear 2' by a screw mechanism (not shown) that is provided between the shaft 3' and the body 13. When the shaft 3' moves linearly, the first piston 3 presses a rotation-out side portion of the brake pad 11.

The second brushless motor 5 (second motor 5) disposed on the rotating-in side in the rotating direction of the brake rotor 10 (rotary member) is fixed to the body 13. A rotating-in side gear 6, which has a small diameter and is fixed to a shaft of the second brushless motor 5, is engaged with a large-diameter gear 6' fixed to a shaft 7' of the second piston 7 that is disposed parallel to the shaft of the second brushless motor 5. When the large-diameter gear 6' rotates, the rotational motion of the second brushless motor 5 is converted into the linear motion of the shaft 7' of the large-diameter gear 6' by a screw mechanism (not shown) that is provided between the shaft 7' and the body 13. When the shaft 7' moves linearly, the second piston 7 presses the rotating-in side portion of the brake pad 11. The brake rotor 10 (rotary member) and the brake pads 11 and 11, which are disposed on both sides of the brake rotor 10 so as to face each other, are supported by a support member 12 of the brake system.

A press sensor 9 and a rotating-out side resolver (rotation angle sensor) 4 are provided on the backside (opposite side to the piston 3) of the large-diameter gear 2' with respect to the shaft 3' of the first piston 3. The press sensor 9 detects a reaction force against a pressing force of the piston 3. Further, the rotation-out side resolver 4 detects a position of the shaft 3' of the piston 3. The position of the shaft 3' corresponds to a displacement of the piston 3 converted into a linear motion, that is, a rotation angle. In addition, a rotating-in side resolver (rotation angle sensor) 8 is provided on the backside of the large-diameter gear 6' with respect to the shaft 7' of the second piston 7. The rotating-in side resolver 8 detects a position of the shaft 7' of the piston 7. The position of the shaft 7' corresponds to a displacement of the piston 7 converted into a linear motion, that is, a rotation angle.

An operation voltage $E_0$ corresponding to the pedal force F' is output to the first motor from the controller ECU 14 to which a predetermined pedal force F' is input. The first brushless motor rotates by a predetermined angle in accordance with the operation voltage $E_0$. When the shaft 3' of the large-diameter gear 2' rotates by the reduction gear trains 2 and 2', the rotation angle of the shaft 3' is detected by the resolver 4 and the rotational motion of the motor is converted into the linear motion of the shaft 3' by a screw mechanism that is provided between the shaft 3' and the body 13. As a result, the first piston 3 presses the rotating-out side portion of the brake pad 11, and the press sensor 9 detects a pressing force.

In the first exemplary embodiment of the invention, the position of the shaft 3' that relates to an axial force F of the first piston 3 corresponding to a predetermined pressing force, that is, a detected rotation angle $\theta_0$ at the rotating-out side is fed back to the ECU 14 so that an axial force control is performed for the first piston 3. Further, a position control (rotation angle control) is performed for the second piston 7 on the basis of the axial force F of the first piston 3 and the detected rotation angle $\theta_0$ at the rotating-out side. In this case, when a rotation angle $\theta_1$ at the rotating-in side, which is detected by the rotating-in side resolver 8 provided on the shaft 7' of the second piston 7, is fed back to the controller ECU 14, an operation voltage $E_1$ of the second motor is obtained from the controller ECU 14. As a result, the rotation angle control is performed on the basis of the operation voltage $E_1$.

FIG. 2 is a flow chart of the control method according to the first exemplary embodiment of the invention. Referring to FIG. 1, when a pedal force of the pedal 15 is detected in Step 1 (pedal force F'>0), the pedal force F' is input to the controller ECU 14 from the pedal force sensor 16. In Step 2, the axial force F output from the press sensor 9 is fed back to the controller ECU 14. In Step 3, the operation voltage $E_0$ of the first motor is calculated in the controller ECU 14 on the basis of the pedal force F' and the axial force F output from the press sensor 9. For example, a general PID control expression may be used to calculate the operation voltage $E_0$ as follow:

$E_0$=proportional gain×(F'−F)+integral gain×∫(F'−F)+ differential gain×d(F'−F)/dt In Step 4, the operation voltage $E_0$ of the first brushless motor 1 is output from the controller ECU 14. The axial force control is performed for the second piston 3 through the above-mentioned Steps 1 to 4 so that the axial force is fed back by the press sensor 9.

In Step 5, the rotation angle $\theta_0$ at the rotating-out side is detected by the rotation-out side resolver 4. In Step 6, the rotation angle $\theta_1$ at the rotating-in side is fed back to the controller ECU 14 by the rotation-in side resolver 8. In Step 7, the operation voltage $E_1$ of the second motor is calculated in the controller ECU 14 on the basis of the rotation angle $\theta_0$ at the rotating-out side and the rotation angle $\theta_1$ at the rotating-in side. For example, a general PID control expression may be used to calculate the operation voltage $E_1$ as follow:

$E_1$=proportional gain×($\theta_0$−$\theta_1$)+integral gain×∫($\theta_0$−$\theta_1$)+differential gain×d($\theta_0$−$\theta_1$)/dt In Step 8, the operation voltage $E_1$ is output from the controller ECU 14 to the second brushless motor 5. The position control based on the position of the first piston 3 is performed for the second piston 7 through the above-mentioned Steps 5 to 8. During the braking, an axial force from the second piston 7 and a force to be wound on the rotor 10 are applied to the rotating-in side portion of the brake pad 11. However, since the position of the second piston 7 is controlled, an excessive axial force is not applied to the rotating-in side portion. As a result, it is possible to effectively prevent the uneven wear.

FIG. 3 is a view showing a partial configuration of an electric brake according to a second exemplary embodiment of the invention. In the second exemplary embodiments, in addition to the first and second pistons disposed on one side in the axial direction of the brake rotor, a third piston and a fourth piston are disposed on the other side in the axial direction of the brake rotor. The third piston 3 is disposed on the rotating-out side in the rotational direction of the brake rotor 10. The fourth piston 7 is disposed on the rotating-in side in the rotational direction of the brake rotor 10.

In the electric brake of the second exemplary embodiment, the first to fourth pistons 3 and 7 are pressed to brake pads (friction members) 11 at two points that are positioned on both sides of a brake rotor (rotary member) 10 at the rotating-in side and the rotating-out side in the rotating direction of the brake rotor 10. Further, axial force controls are performed for the first and third pistons 3 and 3, and position controls based on the positions of the first and third pistons 3 and 3 are performed for the second and fourth pistons 7 and 7. As a result, friction members such as brake pads come in contact with the both sides of the brake rotor 10. Since a pressing force is further dispersed as described above even in the case of an electric brake capable of uniformly and reliably applying the brake, it is possible to use a motor having a small capacity. Furthermore, since a position control based on the position controls of the first and third pistons 3 and 3 are performed for the second and fourth pistons 7 and 7, it is possible to effectively prevent an excessive axial force from being applied to the brake pad 11 in accordance with a winding load generated at the rotating-in side. As a result, it is possible to prevent the uneven wear of the brake pad 11. In addition, the relationships between the input of a pedal force of the brake pedal and the controller ECU 14, the motors 1 and 5, the press sensors 9, the resolvers 4 and 8 are substantially the same as those of the electric brake system in the first exemplary embodiment shown in FIG. 1.

Further, a sensor for detecting the position of a magnetic pole can be used in the motor to detect the positions of the pistons 3 and 7, in the first and second exemplary embodiments. In this case, since the resolvers 4 and 8 such as rotation angle detecting sensors, or particular sensors instead of the resolvers are not required, the number of parts is reduced. As a result, it is possible to simplify the configuration of the electric brake.

Although the invention has been described in connection with the specific exemplary embodiments of the invention as described above, it is possible to properly select the type of pedal force sensors for detecting a pedal force, the type of the structure for fixing the motor to the brake system, the type of the motor, the type of the structure for converting the rotational motion into the linear motion, the shape and type of the piston, the shapes and types of the friction member and the rotary member, the (single-surface or both-surface) type of the structure for pressing the piston to the friction member, the type of the axial force control of the piston on the rotating-out side (the type of the feedback control performed by the controller in accordance with the axial force), the type of the position control of the piston on the rotating-in side (the type of the feedback position control performed by the controller in accordance with the position of the piston on the rotating-out side), the type of the detection of the position of the piston (the detection may be performed by a sensor for detecting the position of a magnetic pole), and the types of an axial force detecting sensor and the sensor for detecting the rotation angle of the piston.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An electric brake, comprising:
   a friction member;
   a rotor;
   a first piston configured to press the friction member to the rotor;
   a second piston configured to press the friction member to the rotor;
   a first motor configured to actuate the first piston;
   a second motor configured to actuate the second piston;
   a press sensor configured to detect an axial force of the first piston to press the friction member;
   a first position sensor configured to detect a position of the first piston;
   a second position sensor configured to detect a position of the second piston; and
   a controller configured to calculate a first signal as an operation signal of the first motor and a second signal as an operation signal of the second motor;
   wherein the first piston and the second piston are spaced in a circumferential direction of the rotor;
   wherein the detected axial force is fed back to the controller, and the controller calculate calculates the first signal based on the axial force; and
   wherein the detected position of the second piston is fed back to the controller, and the controller calculates the second signal so that the position of the second piston conforms to the detected position of the first piston.

2. The electric brake according to claim 1, wherein the first signal comprises an operation voltage of the first motor; and
   wherein the second signal comprises an operation voltage of the second motor.

3. The electric brake according to claim 1, wherein the first piston is disposed on a rotating-out side in the circumferential direction of the rotor, and
   wherein the second piston is disposed on a rotating-in side in the circumferential direction of the rotor.

4. The electric brake according to claim 1, wherein the first position sensor comprises a first rotation angle sensor for detecting a rotation angle of the first motor; and
   wherein the second position sensor comprises a second rotation angle sensor for detecting a rotation angle of the second motor.

5. The electric brake according to claim 1, wherein the first position sensor comprises a first sensor for detecting a position of a magnetic pole of the first motor; and
   wherein the second position sensor comprises a second sensor for detecting a position of a magnetic pole of the second motor.

6. A control method of an electric brake, wherein the electric brake including:
   a friction member;
   a rotor;
   a first piston configured to press the friction member to the rotor;
   a second piston spaced in a circumferential direction of the rotor from the first piston and configured to press the friction member to the rotor;
   a first motor configured to actuate the first piston;
   a second motor configured to actuate the second piston;
   a press sensor configured to detect an axial force of the first piston to press the friction member;
   a first position sensor configured to detect a position of the first piston;
   a second position sensor configured to detect a position of the second piston; and
   a controller configured to calculate a first signal as an operation signal of the first motor and a second signal as an operation signal of the second motor, the control method comprising:
   feeding back the detected axial force to the controller;
   calculating the first signal based on the axial force;
   feeding back the detected position of the second piston to the controller; and
   calculating the second signal so that the position of the second piston conforms to the detected position of the first piston.

7. The control method according to claim 6, wherein the first signal comprises an operation voltage of the first motor; and
   wherein the second signal comprises an operation voltage of the second motor.

8. The control method according to claim 6, wherein the first piston is disposed on a rotating-out side in the circumferential direction of the rotor, and
   wherein the second piston is disposed on a rotating-in side in the circumferential direction of the rotor.

9. The control method according to claim 6, wherein the first position sensor detects a rotation angle of the first motor; and
   wherein the second position sensor detects a rotation angle of the second motor.

10. The control method according to claim 6, wherein the first position sensor detects a position of a magnetic pole of the first motor; and
    wherein the second position sensor detects a position of a magnetic pole of the second motor.

* * * * *